United States Patent
Lee (10) Patent No.: US 10,099,578 B2
(45) Date of Patent: Oct. 16, 2018

(54) PUMPING DEVICE FOR VEHICLE SEAT

(71) Applicant: HYUNDAI DYMOS INCORPORATED, Seosan-si, Chungcheongnam-do (KR)

(72) Inventor: Young Sun Lee, Namyangju-si (KR)

(73) Assignee: HYUNDAI DYMOS INCORPORATED, Seosan-Si Chungcheongnam-Do ( * ) Notice: Subject to any disclaimer, the term of this patent is extended or adjusted under 35 U.S.C. 154(b) by 0 days.

(21) Appl. No.: 15/279,532

(22) Filed: Sep. 29, 2016

(65) Prior Publication Data

US 2017/0096083 A1    Apr. 6, 2017

(30) Foreign Application Priority Data

Oct. 1, 2015 (KR) .......................... 10-2015-0138348

(51) Int. Cl.
*B60N 2/16* (2006.01)
*F16H 25/16* (2006.01)

(52) U.S. Cl.
CPC ........... *B60N 2/1635* (2013.01); *F16H 25/16* (2013.01)

(58) Field of Classification Search
CPC ....... B60N 2/16; B60N 2/1635; F16D 41/067; F16D 41/088
USPC .......................................................... 192/15
See application file for complete search history.

(56) References Cited

U.S. PATENT DOCUMENTS

| 7,032,731 | B2 * | 4/2006 | Kim ...................... | B60N 2/167 |
| | | | | 192/15 |
| 8,985,296 | B2 * | 3/2015 | Kawai ................. | B60N 2/1615 |
| | | | | 192/223.2 |
| 9,469,219 | B2 * | 10/2016 | Kim ........................ | B60N 2/22 |
| 2004/0099498 | A1 * | 5/2004 | Kurita .................. | B60N 2/1615 |
| | | | | 192/12 B |
| 2010/0175962 | A1 * | 7/2010 | Kawai .................. | B60N 2/1615 |
| | | | | 192/16 |
| 2012/0152686 | A1 * | 6/2012 | Brewer ................... | F16D 27/10 |
| | | | | 192/84.1 |

FOREIGN PATENT DOCUMENTS

| CN | 101790650 A | 7/2010 |
| CN | 104395139 A | 3/2015 |

(Continued)

OTHER PUBLICATIONS

Chinese Office Action dated Jul. 10, 2018 from the corresponding Chinese Application No. 201610865344.8, 5 pp.

*Primary Examiner* — Stacey A Fluhart
(74) *Attorney, Agent, or Firm* — Brinks Gilson & Lione (57) ABSTRACT

The present disclosure provides a pumping device of a vehicle seat and its operation mechanism. The pumping device includes: a housing encasing a pumping mechanism; a spring guide which has a ring shape formed with a cavity and is seated on a top surface of the housing, a coil spring being inserted in the spring guide; and a lever bracket which has a protruding portion formed on a central portion, an operating lever being coupled to a flange, and a locking protrusion protruding from the flange and locked to the coil spring through the guide slit of the spring guide. In particular, the protruding portion is connected to a cam of the pumping mechanism in a state of being inserted into the cavity of the spring guide.

9 Claims, 7 Drawing Sheets

(56) References Cited

FOREIGN PATENT DOCUMENTS

| | | | |
|---|---|---|---|
| JP | 2008-296856 | A | 12/2008 |
| KR | 10-0789641 | B | 12/2007 |
| KR | 10-0921849 | B1 | 10/2009 |
| KR | 10-2013-0027060 | A | 3/2013 |
| KR | 10-2014-0085059 | A | 7/2014 |

\* cited by examiner

PUMPING DEVICE FOR VEHICLE SEAT

CROSS-REFERENCE TO RELATED APPLICATION

This application claims priority to and the benefit of Korean Patent Application No. 10-2015-0138348, filed on Oct. 1, 2015, which is incorporated herein by reference in its entirety.

FIELD

The present disclosure relates to a pumping device and its operating mechanism to adjust a seat of a vehicle.

BACKGROUND

The statements in this section merely provide background information related to the present disclosure and may not constitute prior art.

A pumping device is provided in a vehicle so that a height of a seat cushion can be adjusted. Such a pumping device may be configured in an automatic type by coupling a motor or may be configured in a manual type by coupling an operating lever.

The pumping device is equipped with a pumping mechanism inside a housing, and the pumping mechanism is provided to allow braking and clutch functions, using a cam.

The operating lever is provided a restoring force, using an inside spring of the pumping mechanism, or an additional external spring.

However, we have discovered that: when using the internal spring, there is a problem of a weak restoring force; when using the external spring, there is a problem of non-compact of a package; and when using a ring-shaped spring for compact packaging, there is a problem of poor tension and durability of the spring.

Matters described as the background art is only intended to facilitate the understanding of the background of the present disclosure, but should not be recognized as corresponding to the already known prior art to those skilled in the art.

SUMMARY

The present disclosure provides a pumping device of a vehicle seat and its operating mechanism capable of avoiding an increase in thickness, while improving the restoring force of the operating lever and improving the durability of the spring to provide the restoring force.

According to an aspect of the present disclosure, a pumping device of a vehicle seat includes: a housing encasing a pumping mechanism; a spring guide which has a ring shape formed with a cavity, is seated on a top surface of the housing, an annular space portion being formed inside of the spring guide, a coil spring being inserted in along the space portion, a guide slit formed on a top surface of the spring guide along a circular arc direction of the ring shaped spring guide; and a lever bracket which has a protruding portion formed on a central portion of the lever bracket, a flange formed along an edge of the protruding portion, an operating lever being coupled to the flange, and a locking protrusion protruding from the flange and locked to the coil spring through a guide slit of the spring guide. In particular, the protruding portion is connected to a cam of the pumping mechanism in a state of being inserted into the cavity of the spring guide.

The spring guide is made up of a top surface, an inner surface and an outer surface, a lower surface has an opening, a space portion is formed between the top surface, and the inner and outer surfaces, and the coil spring can be inserted through the opening of the lower surface.

A plurality of assembling protrusions protrude from the inner surface or the outer surface of the spring guide, and a plurality of assembly holes may be formed on the top surface of the housing so that the assembling protrusions can be inserted and coupled to the corresponding assembling holes.

The guide slit of the spring guide communicates with the annular space portion, a protruding support portion is formed near the center portion of the guide slit, and the coil spring may be assembled to be blocked by the protruding portion at both end portions to face each other.

The locking protrusion of the lever bracket is inserted into the center portion of the guide slit, and may press and compress the end portion of the coil spring when the lever bracket rotates to any one side.

An operating hole is formed at the center of the top surface of the housing, and a coupling protrusion coupled with the lever bracket through the operating hole may be formed in the cam.

The operating hole may be a fan arc-shaped operating slit having a predetermined length, and a bi-directional movement displacement of the coupling projection may be limited by the fan arc-shaped operating slit.

The length of the protruding portion of the lever bracket corresponds to the hollow depth of the spring guide, and the flange of the lever bracket may come into close contact with the top surface of the spring guide.

When the operating lever rotates in the state in which the housing is fixed to the seat of the vehicle, the lever bracket rotates together to rotate the cam of the pumping mechanism, when an external force to the operating lever is removed, the operating lever and the lever bracket may be restored to an original position (i.e., a position before the lever bracket is rotated) by the restoring force of the coil spring.

According to another aspect of the present disclosure, there is provided a pumping device operation mechanism of a vehicle seat that includes: a spring guide that has a ring shape formed with a cavity, and is seated on a top surface of a pumping mechanism housing, an annular space portion being formed inside of the spring guide, a coil spring being inserted in along the annular space portion, a guide slit formed on a top surface of the spring guide along a circular arc direction of the spring guide; and a lever bracket. In particular, the lever bracket includes: a protruding portion formed on the central portion of the lever bracket, and a flange formed along an edge of the protruding portion, an operating lever being coupled to the flange, and a locking protrusion protruding from the flange and locked to the coil spring through the guide slit of the spring guide. The protruding portion is connected to a cam of the pumping mechanism in a state of being inserted into the cavity of the spring guide According to forms of the pumping device of the vehicle seat and its operating mechanism of the present disclosure, it is possible to reduce an increase in thickness, while improving the operating force of the operating lever, and improving the durability of the spring.

In particular, by providing an additional spring on the outside of the pumping mechanism, it is easy to adjust the restoring force of the operating lever, and since the space for installing the spring is further secured, it is possible to use the coil spring that is advantageous for durability.

At the same time, even when the spring is provided on the outside, since an increase in the thickness of the entire mechanism is reduced due to the compact design of the operating lever bracket, it is possible to avoid interference with other components when mounted to the vehicle.

In addition, by restricting the radius of rotation of the operating lever using a separate spring guide, a phenomenon in which excessive operating force is transmitted to the interior of the pumping mechanism is inhibited or prevented, and it is possible to reduce the deformation of the internal components.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 7:
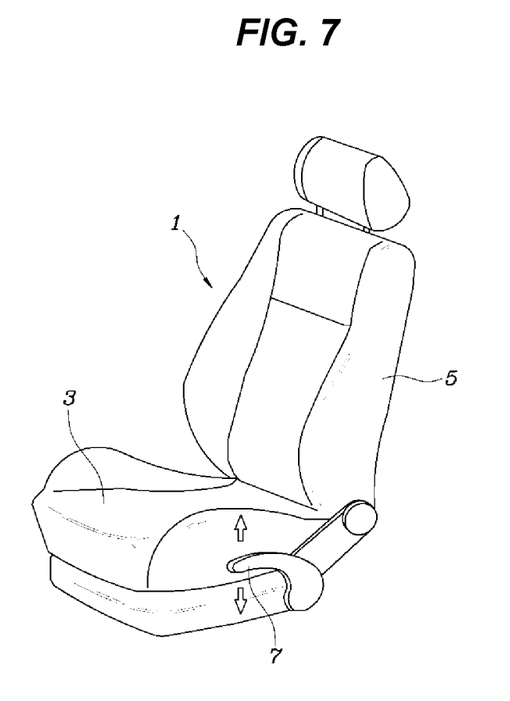
FIG. 7 is a diagram illustrating an example of a vehicle seat to which the pumping device of the present disclosure may be applied.

FIG. 7 illustrates a vehicle seat 1 to which the present disclosure can be applied. The vehicle seat 1 is made up of a seat cushion 3 and a seat back 5, and the seat cushion 3 is provided with an operating lever 7 on the side surface. Thus, when a user operates the operating lever 7, the pumping device of the present disclosure connected to the operating lever 7 is able to adjust the height of the seat cushion 3.

Referring to FIGS. 1-4, the pumping device of a vehicle seat includes: a housing 200 encasing a pumping mechanism 100; a spring guide 300 which has a ring shape formed with a cavity 305, and is seated on a top surface 220 of the housing 200, an annular space portion 360 being formed inside, a coil spring 500 being inserted in along the space portion 360, a guide slit 340 formed along a circular arc direction of the ring shape being formed on a top surface 310; and a lever bracket 400 which has a protruding portion 420 formed on the central portion, has a flange 440 formed along an edge of the protruding portion 420, an operating lever 7 being coupled to the flange 440, the protruding portion 420 being connected to a cam 120 of the pumping mechanism 100 in a state of being inserted into the cavity 305 of the spring guide 300, and a locking protrusion 460 locked to the coil spring 500 though a guide slit 340 of the spring guide 300 and protruded from the flange 440.

Figure 1:
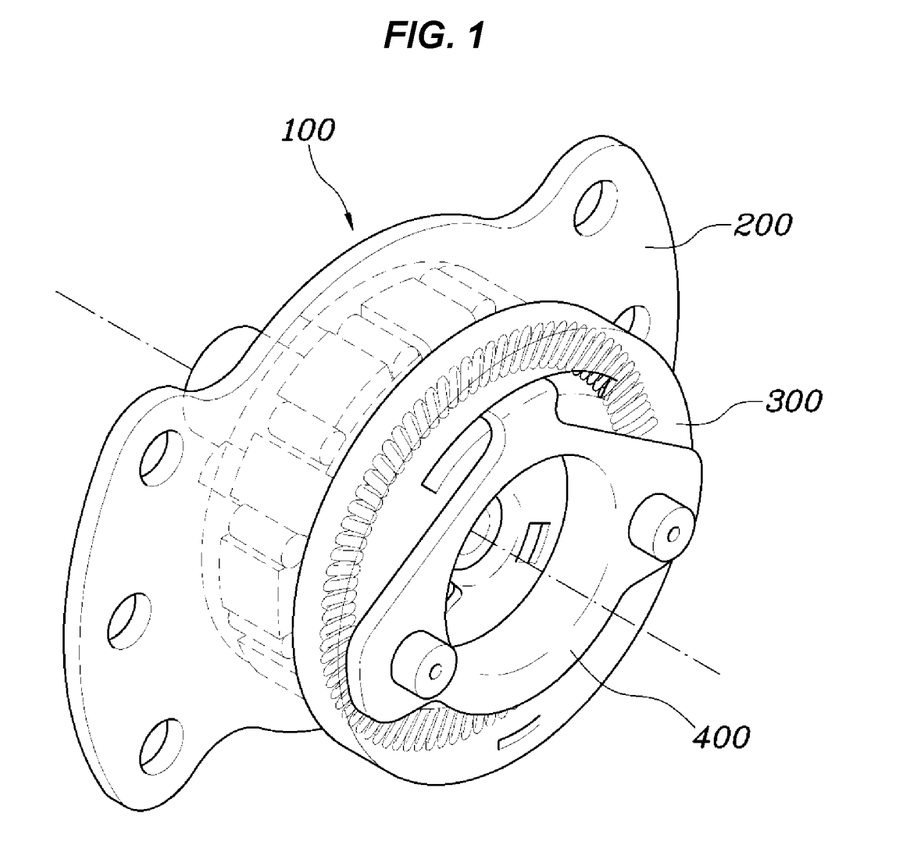
FIG. 1 is a diagram illustrating a pumping device of a vehicle seat.
Figure 2:
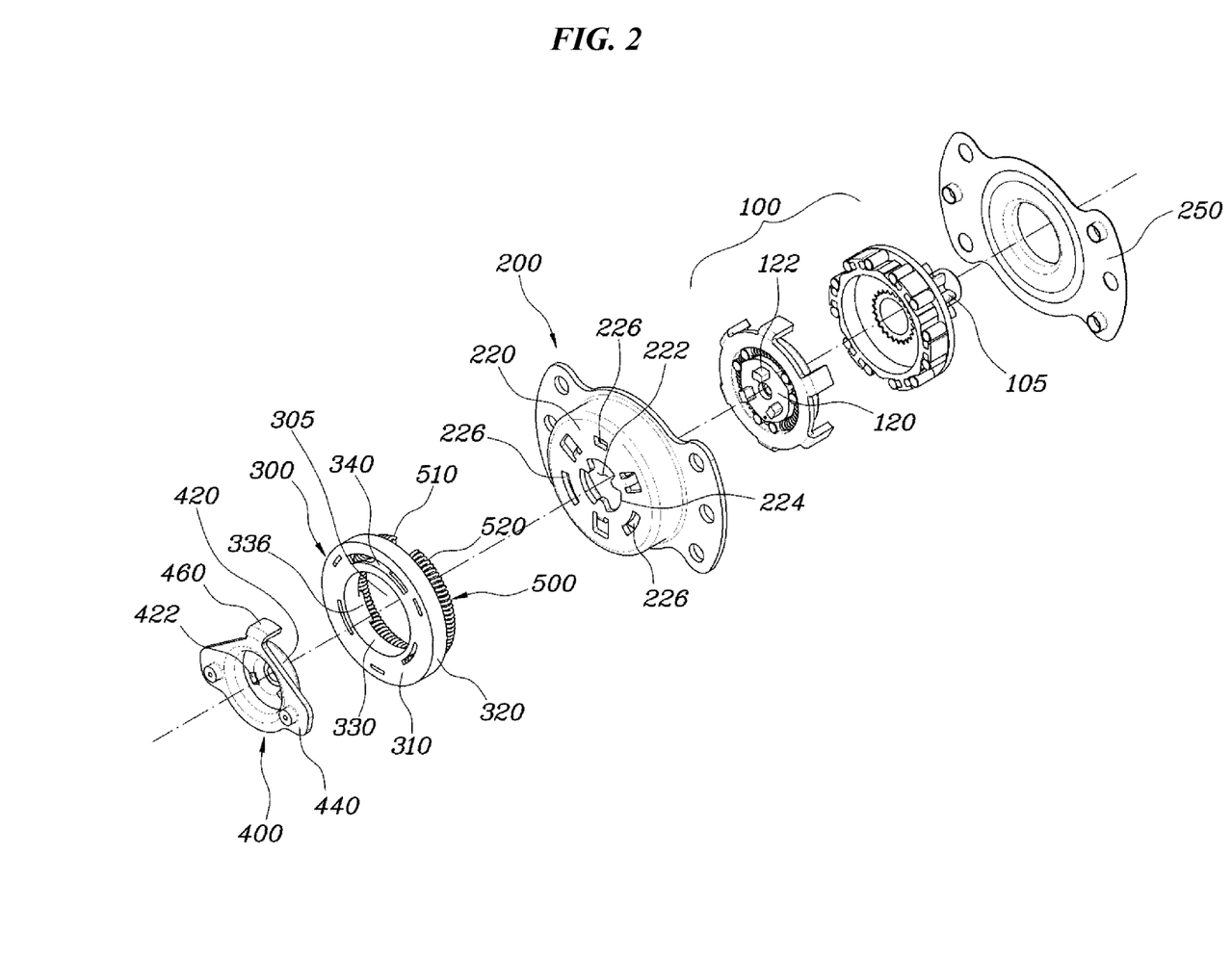
FIG. 2 is an exploded view of the pumping device of the vehicle seat illustrated in FIG. 1.

FIG. 1 is a perspective view of a state in which the pumping mechanism 100, the housing 200, the spring guide 300 and the lever bracket 400 are coupled, and FIG. 2 is an exploded perspective thereof. A pumping mechanism 100 capable of performing the braking and clutching functions of the pumping device is inserted in the housing 200. Further, the housing 200 is fixedly coupled to the seat of the vehicle, while wrapping around the pumping mechanism 100 together with the housing counter 250.

For reference, a pinion shaft 105 of the pumping mechanism 100 is connected to a linkage (not illustrated) and transmits an operating force generated by the operation of the operating lever 7 so that the seat cushion 3 can be lifted up and down.

Various types of pumping mechanisms are presented in the related art, and the present disclosure has an advantage that can be applied to most of the pumping mechanisms of the type having a conventional cam. On the other hand, the spring guide 300 is seated on the top surface 220 of the housing 200, as illustrated, and the coil spring 500 is inserted in the spring guide 300. Further, the lever bracket 400 is seated on the top surface of the spring guide 300 again, and operating lever 7 is coupled to the lever bracket 400. Therefore, the operating lever is imparted with an operating feeling and restoring force by the coil spring 500 located outside the housing 200.

According to forms of the present disclosure, by installing a separate spring guide 300 on the outside of the housing 200, there is an advantage of design flexibility of enabling the specification of the spring to be variously used, and it is possible to adopt the coil spring 500 with the excellent operation feeling and durability accordingly. Even though the coil spring 500 is applied, the present disclosure provides that there is no significant difference in its thickness from the conventional pumping device, by setting the compact size through the design of the spring guide 300 and the lever bracket 400.

For reference, the thickness of the pumping device means a length measured along the axis as illustrated in FIG. 1 here.

The spring guide 300 has a ring shape formed with the cavity 305, is seated on the top surface 220 of the housing 200, an annular space portion 360 is formed inside, the coil spring 500 is inserted in along the space portion 360, and the guide slit 340 penetrating along the circular arc direction of the ring shaped spring guide 300 is formed on the top surface 310.

Figure 4:
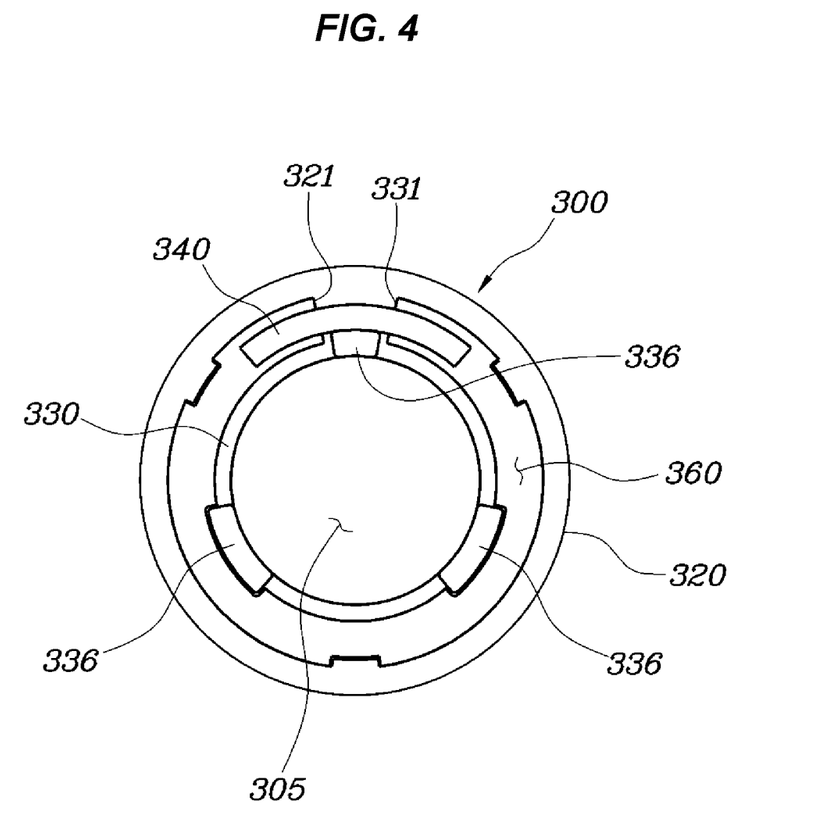
FIG. 4 is a diagram illustrating a spring guide of the pumping device of the vehicle seat illustrated in FIG. 1.
Figure 6:
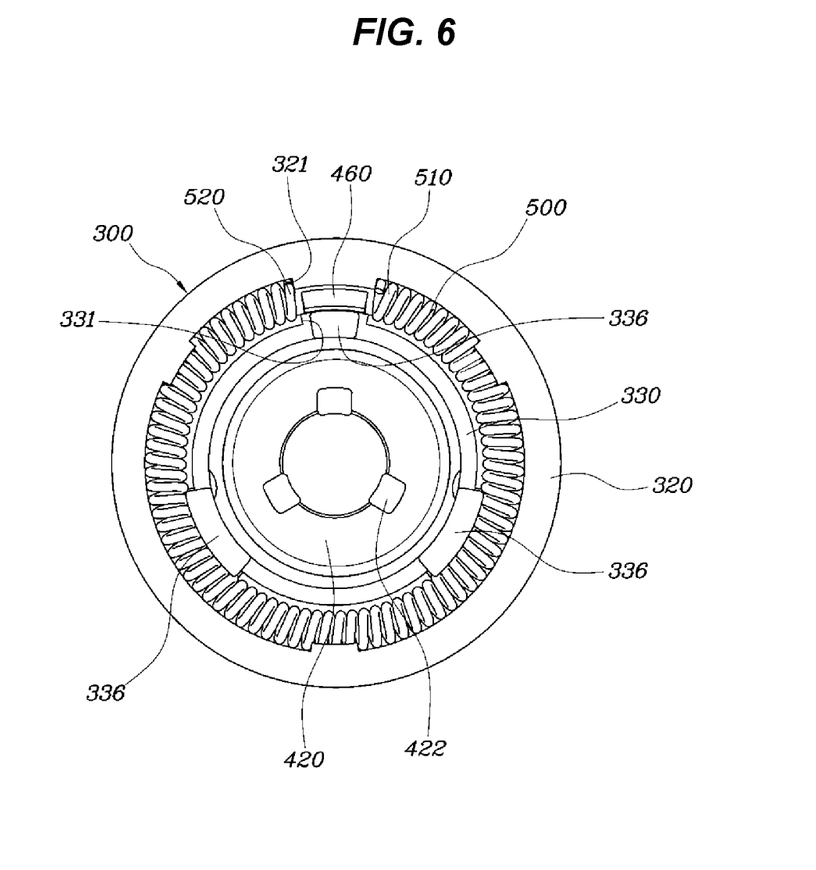
FIG. 6 is a diagram illustrating the spring guide and the coil spring of the pumping device of the vehicle seat illustrated in FIG. 1.

FIG. 4 illustrates the interior of the spring guide 300, and FIG. 6 illustrates a state in which the coil spring 500 is inserted on the spring guide 300.

As described above, the spring guide 300 has a ring shape formed with a cavity 305. A protruding portion 420 of the lever bracket 400 comes into contact with the housing 200 of the pumping device through the cavity 305 of the spring guide 300, so that a compact size can be achieved.

The spring guide 300 is seated on the top surface 220 of the housing 200, and an annular space portion 360 is formed inside. In particular, as illustrated, the spring guide 300 is made up of the top surface 310, the inner surface 330 and the outer surface 320. A lower surface has an open shape (e.g., the lower surface having an opening), the space portion 360 is formed by the top surface 310, the inner surface 330 and the outer surface 320, and the coil spring 500 can be inserted into the space portion 360 through the open lower surface. Thus, it is possible to omit the lower surface of the spring guide 300 and reduce the thickness, and it is easy to insert the coil spring 500 so that the assembling properties can be provided.

Further, the coil spring 500 is inserted in the spring guide 300 along the inner space portion 360, and the guide slit 340 having a constant length along the circular arc direction is formed on the top surface 310. The locking protrusion 460 of the lever bracket 400 is inserted into the guide slit 340.

Figure 3:
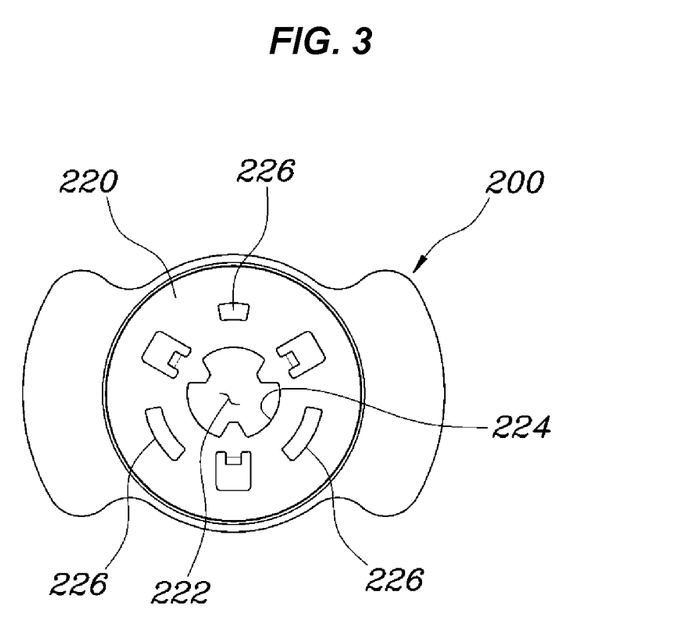
FIG. 3 is a diagram illustrating a vehicle seat housing of the pumping device illustrated in FIG. 1.

On the other hand, FIG. 3 is a diagram illustrating a housing 200 of the pumping device of the vehicle seat illustrated in FIG. 1, a plurality of assembling protrusions 336 protrudes from the inner surface 330 or the outer surface 320 of the spring guide 300, and a plurality of assembling holes 226 may be formed on the top surface 220 of the housing 200 so that the assembling protrusions 336 are inserted and coupled thereto. Therefore, the spring guide 300 is assembled to the housing 200 in a state in which the coil spring 500 is inserted therein, and the spring guide 300 and the housing 200 can be coupled to each other using welding or the like, after its position is restricted through the temporal fastening between the assembling protrusions 336 and the assembling holes 226.

Figure 5:
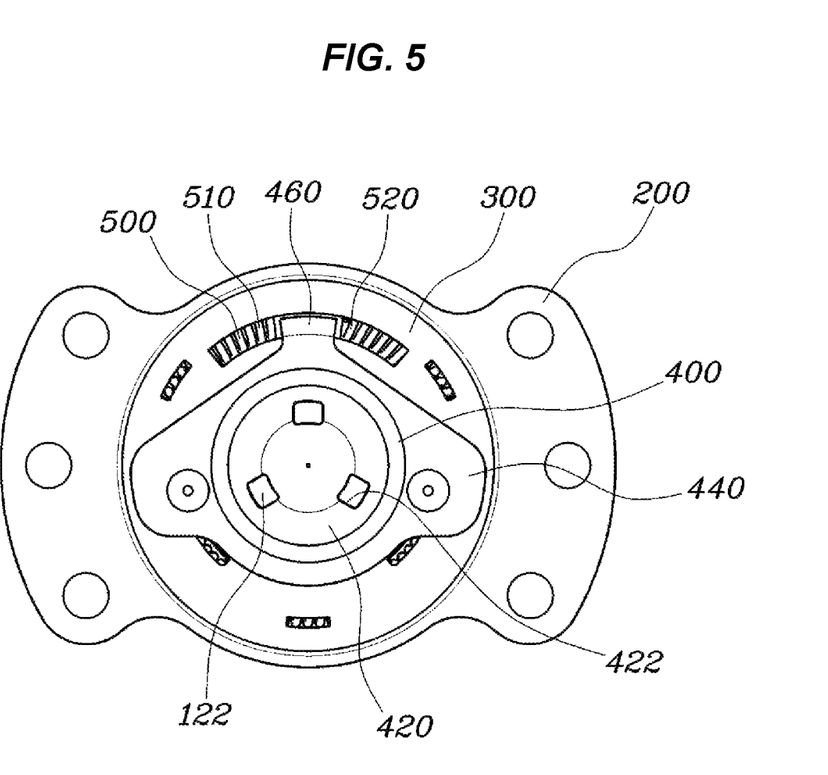
FIG. 5 is another diagram illustrating a pumping device of the vehicle seat illustrated in FIG. 1.

Referring to FIGS. 2 and 5, the protruding portion 420 is formed in the central portion of the lever bracket 400, and the flange 440 extends outside from the edge of the projecting portions 420, forming a vertical bent relative to the projecting portions 420.

Specifically, the length of the protruding portion 420 of the lever bracket 400 corresponds to the depth of the cavity 305 of the spring guide 300, i.e., the height of the spring guide 300. Thus, the flange 440 of the lever bracket 400 may come into close contact with the top surface of the spring guide 300, and the overall size is made compact.

Further, the operating lever 7 operated by a user is coupled to the flange 440 of the lever bracket 400, and the protruding portion 420 is physically connected to the cam 120 of the pumping mechanism 100 in the state of being inserted into the cavity 305 of the spring guide 300. Thus, at the time of rotation of the operating lever, the lever bracket 400 rotates the cam 120 of the pumping mechanism 100, and eventually it is possible to operate the pumping device.

The locking protrusion 460 locked to the coil spring 500 through the guide slit 340 of the spring guide 300 protrudes from the flange 440 of the lever bracket 400. As illustrated, the guide slit 340 of the spring guide 300 communicates with the interior space portion 360. Further, near the center portion of the guide slit 340, protruding support portions 321, 331 are formed. The coil spring 500 inserted into the space portion 360 can be assembled so that both ends are blocked by the supports 321, 331 and face each other. Further, the locking protrusion 460 of the lever bracket 400 is inserted into the portions facing each other through the guide slit 340.

Thus, the locking protrusion 460 of the lever bracket 400 is inserted into the center of the guide slit 340, and when the lever bracket 400 rotates to any one side, the locking protrusion 460 can press and compress the end portions 510, 520 of the coil spring 500. Referring to FIG. 5, when the lever bracket 400 rotates in a clockwise direction, the locking protrusion 460 rotates, while urging the right end portion of the coil spring 520, and thus, the coil spring 500 is compressed to store the restoring force. In addition, at the time of rotation of the lever bracket 400 in a counterclockwise direction, the locking protrusion 460 urges the left end portion 510 of the coil spring 500 to compress the coil spring 500 and store a restoring force, thereby being able to provide the restoring force of the operating lever in both directions. The both end portions 510, 520 of the coil spring 500 are usually blocked by the support portion while facing each other, and the locking protrusion 460 of the lever bracket 400 is always subjected to the elastic restoring force that is originally positioned at the center of the guide slit 340.

On the other hand, as illustrated in FIG. 3, an operating hole 222 is formed at the center of the top surface 220 of the housing 200, and as illustrated in FIGS. 2 and 5, a coupling protrusion 122 can be formed in the cam 120, and the coupling protrusion 122 is coupled with the hole 422 of the protruding portion 420 of the lever bracket 400 through the operating hole 222. Thus, the lever bracket 400 and the cam 120 rotate together. The operating hole 222 may be formed by a combination of fan arc-shaped operating slits 224 having a certain length, and the bi-directional movement displacement of the coupling protrusion 122 can be limited by the length of the operating slits 224 accordingly. Accordingly, the amount of rotation of the operating lever is primarily limited by the length of the guide slits 340 so that no excessive rotational force of the operating lever is transmitted to the interior of the pumping mechanism 100. At the same time, since the amount of rotation of the lever bracket 400 is also limited by the length of the operating slits, a double safety device capable of limiting the amount of rotation is designed, and durability of the internal pumping mechanism 100 is enhanced correspondingly.

When the operating lever rotates in a state in which the housing 200 is fixed to the seat of the vehicle, the cam 120 of the pumping mechanism 100 is rotated while the lever bracket 400 to operate the pumping device rotates. Further, when an external force (e.g., a user's control) acting on the operating lever is removed, the operating lever 7 and the lever bracket 400 can be restored to the original position by the restoring force of the coil spring 500.

According to such a pumping device of the vehicle seat of the present disclosure and its operating mechanism, it is possible to avoid the increase in thickness, while improving the operating force of the operating lever and improving the durability of the spring.

In particular, by providing an additional spring on the outside of the pumping mechanism, it is easy to adjust the restoring force of the operating lever, and the space for installing the spring is further secured, and thus, it is possible to use the coil spring desirable for durability.

At the same time when the spring is provided on the outside, an increase in the thickness of the entire mechanism is reduced due to the compact design of the operating lever bracket, and it is possible to avoid interference with other components when mounted to the vehicle.

In addition, by restricting the radius of rotation of the operating lever using a separate spring guide, a phenomenon in which excessive operating force is transmitted to the interior of the pumping mechanism is inhibited or prevented, and it is possible to reduce the deformation of the internal components and to improve durability.

While the present disclosure has been described and illustrated with reference to specific forms, it is obvious to those skilled in the art that the present disclosure may be variously improved and changed within the scope that does not depart from the technical idea of the present disclosure.

What is claimed is:

1. A pumping device of a vehicle seat comprising:
a housing configured to encase a pumping mechanism;

a spring guide which has a ring shape formed with a cavity and is seated on a top surface of the housing, an annular space portion being formed inside, a coil spring configured to insert in the annular space portion, a guide slit formed through a top surface of the spring guide along a circular arc direction of the spring guide; and a lever bracket which has a protruding portion formed on a central portion of the lever bracket, a flange formed along an edge of the protruding portion, an operating lever being coupled to the flange, a locking protrusion protruding from the flange and configured to be locked to the coil spring through the guide slit of the spring guide, wherein the protruding portion is connected to a cam of the pumping mechanism in a state that the protruding portion is inserted into the cavity of the spring guide, and wherein a plurality of assembling protrusions protrude from an inner surface or an outer surface of the spring guide, and a plurality of assembly holes are formed on the top surface of the housing so that the assembling protrusions are configured to be inserted and coupled to the corresponding assembling holes.

2. The pumping device of the vehicle seat of claim 1, wherein the spring guide comprises the top surface, an inner surface and an outer surface, a lower surface has an opening, and the annular space portion is formed between the top surface, and the inner and outer surfaces, wherein the coil spring is inserted through the opening of the lower surface.

3. The pumping device of the vehicle seat of claim 1, wherein the guide slit of the spring guide is configured to communicate with the annular space portion, a protruding support portion is formed near a center portion of the guide slit, and the coil spring is assembled to be blocked by the protruding support portion at both end portions to face each other.

4. The pumping device of the vehicle seat of claim 3, wherein the locking protrusion of the lever bracket is configured to insert into the center portion of the guide slit, and configured to press and compress the end portions of the coil spring when the lever bracket rotates to any one side.

5. The pumping device of the vehicle seat of claim 1, wherein an operating hole is formed at a center of the top surface of the housing, and a coupling protrusion coupled with the lever bracket through the operating hole is formed in the cam.

6. The pumping device of the vehicle seat of claim 5, wherein the operating hole is constituted by a combination of fan arc-shaped operating slits having a predetermined length, and a bi-directional movement displacement of the coupling protrusion is limited by the fan arc-shaped operating slits.

7. The pumping device of the vehicle seat of claim 1, wherein a length of the protruding portion of the lever bracket corresponds to a hollow depth of the spring guide, and the flange of the lever bracket is configured to come into a close contact with the top surface of the spring guide.

8. The pumping device of the vehicle seat of claim 1, wherein, when the operating lever rotates while the housing is fixed to the seat of the vehicle, the lever bracket rotates together to rotate the cam of the pumping mechanism, and when an external force to the operating lever is removed, the operating lever and the lever bracket are restored to an original position by restoring force of the coil spring.

9. A pumping device operation mechanism of a vehicle seat, the pumping device operation mechanism comprising:

a spring guide that has a ring shape formed with a cavity, and is seated on a top surface of a pumping mechanism housing, an annular space portion being formed inside of the spring guide, a coil spring being inserted in the annular space portion, a guide slit formed on a top surface of the spring guide along a circular arc direction of the ring shape of the spring guide; and a lever bracket that has a protruding portion formed on a central portion of the lever bracket, a flange formed along an edge of the protruding portion, an operating lever being coupled to the flange, and a locking protrusion protruding from the flange and configured to be locked to the coil spring through the guide slit of the spring guide, wherein the protruding portion is connected to a cam of the pumping mechanism in a state that the protruding portion is inserted into the cavity of the spring guide, wherein a plurality of assembling protrusions protrude from an inner surface or an outer surface of the spring guide, and a plurality of assembly holes are formed on the top surface of the housing so that the assembling protrusions are configured to be inserted and coupled to the corresponding assembling holes.

* * * * *